March 18, 1924.
A. W. WILLIAMS
TROLLEY CONTACT
Filed May 4, 1923
1,486,999
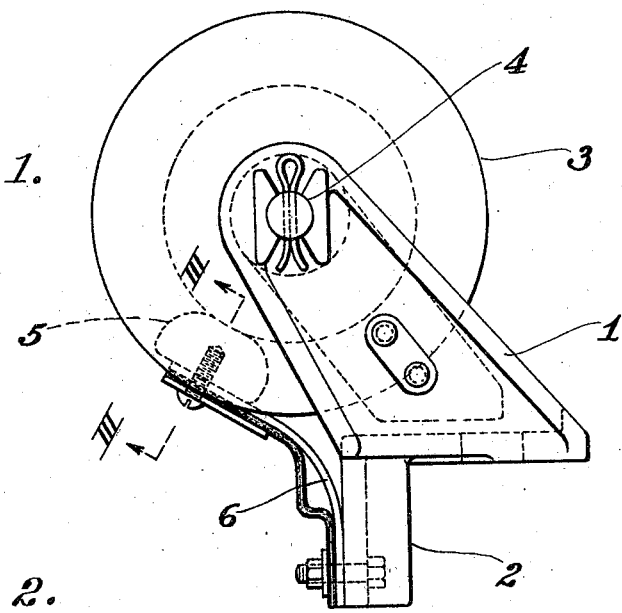
Fig. 1.
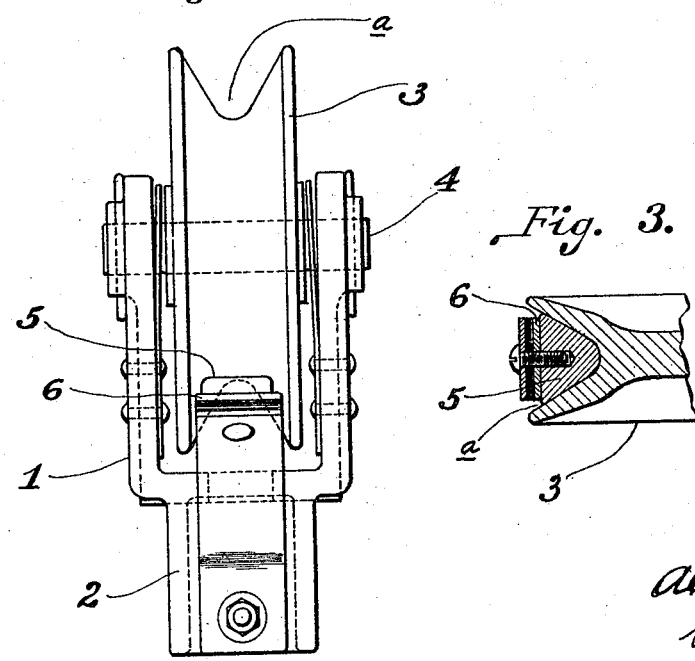
Fig. 2.
Fig. 3.
Alonzo W. Williams
INVENTOR
by John H. Roney
his Attorney Patented Mar. 18, 1924.

1,486,999

UNITED STATES PATENT OFFICE.

ALONZO W. WILLIAMS, OF BOLIVAR, PENNSYLVANIA.

TROLLEY CONTACT.

Application filed May 4, 1923. Serial No. 636,573.

*To all whom it may concern:*

Be it known that I, ALONZO W. WILLIAMS, a citizen of the United States, residing at Bolivar, in the county of Westmoreland and State of Pennsylvania, have invented a new and useful Improvement in Trolley Contacts, of which improvement the following is a specification.

My invention relates to improvements in trolley contacts. I am aware that numerous contact devices are known, but so far as I am aware, the efficiency of all of said devices is greatly impaired, for, amongst other reasons, lack of complete contact of the adjacent portions of the wheel and the contact block; insufficient contactual area between the wheel and the contact block an intermittence in contact causing arcing.

The object of the present invention is to eliminate these objections and produce a contact that will be efficient when the minimum load and also the maximum or peak load is being transmitted through the trolley line.

I accomplish this object by means of the device hereinafter more specifically described, reference being had to the accompanying drawings forming part hereof, in which:

Fig. 1 is a side elevation of a trolley harp showing my improved contact applied thereto.

Fig. 2 is a front elevation.

Fig. 3 is a sectional view on line III—III of Fig. 1.

Referring to said drawings: 1 is a trolley harp having a downwardly projecting shank 2, to which the trolley pole, not shown, is adapted to be secured. 3 is the trolley wheel mounted on the shaft 4, which is journalled in the walls of the harp. 5 is a contact block, the inner face of which is correspondingly shaped with the groove *a* in the wheel 3 and is adapted to form a complete contact with the bottom and side walls of said groove and thus reduce to a minimum or eliminate entirely the danger of arcing. The said contact block is formed of material having suitable conductivity to transmit or convey the maximum current carried by the trolley line and is formed, as shown, to not only provide a complete contact between the wheel and the block, but also furnish a maximum degree of area of contact between the wheel and said block and is held in firm engagement in the groove to ensure against accidental displacement by means of the arm 6, to one end of which said block is secured. The other end of said arm being secured to the shank 2. The said arm is almost rigid, that is to say the tension of the same upon the block is sufficient to hold said block in almost immovable contact with the wheel without, however, preventing the wheel from rotating, thus preventing the contact block from jumping or jolting away from the wheel and preventing arcing. The arm is of material having high conductivity, preferably copper reinforced with either steel or brass plates to reduce the flexibility thereof and to give the same the rigidity required to hold the block firmly in the groove of the wheel, as above set forth.

Having described my invention, what I claim and desire to secure by Letters Patent is:

The combination of a trolley harp, a trolley wheel journalled in said harp and having a groove in the periphery thereof, a contact block seated in said groove and being correspondingly shaped therewith and contacting against said groove in its entirety, the said contact block being held in said groove by an arm substantially rigid and non-flexible.

In testimony whereof, I have hereunto signed my name in the presence of two subscribing witnesses.

ALONZO W. WILLIAMS.

In the presence of—
    JOHN GABLUNGER,
    CORA J. NAUGLE.